Jan. 15, 1935.   T. M. BERRY   1,988,295

YIELDABLE SUPPORTING STRUCTURE

Filed Aug. 30, 1934

Inventor:
Theodore M. Berry,
by Harry E. Dunham
His Attorney.

Patented Jan. 15, 1935

1,988,295

UNITED STATES PATENT OFFICE 1,988,295

YIELDABLE SUPPORTING STRUCTURE

Theodore M. Berry, Schenectady, N. Y., assignor to General Electric Company, a corporation of New York Application August 30, 1934, Serial No. 742,131

5 Claims. (Cl. 248—16)

The present invention relates to yieldable supporting structures, more specifically to the kind of arrangements in which a vibrating machine element is yieldably held on a support by means including a helically wound spring permitting the supported machine element to move in any direction relative to its support.

When a vibrating element, such as a machine, is attached to a support by means of a helical spring which has several resonant frequencies, for different modes of vibration, the spring acts like a rigid body at these frequencies, and vibrations of the machine are transmitted to the support unattenuated at resonant frequencies. Also, when the springs are subjected to shock excitation, such as in the valve mechanism of automobiles, large vibrations at resonant frequencies of the spring may be set up, which produce abnormal stresses in the spring, causing it to be damaged. These vibrations of the spring are undesirable because they lead in many cases to breakage of the spring.

The object of my invention is to provide an improved arrangement of the type of arrangements above specified in which vibratory motions of the spring are dampened or considerably reduced.

For a consideration of what I believe to be novel in my invention, attention is directed to the following description and the claims appended thereto in connection with the accompanying drawing.

Figure 1:
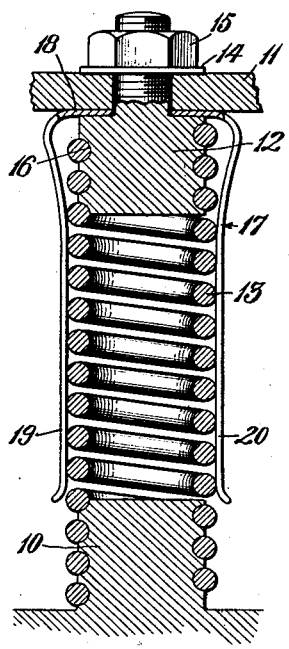
Figure 2:
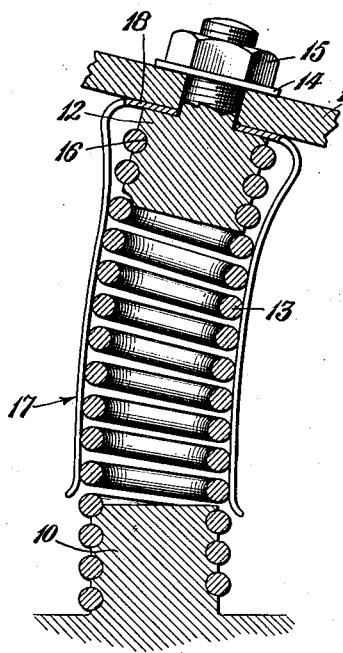
Figure 3:
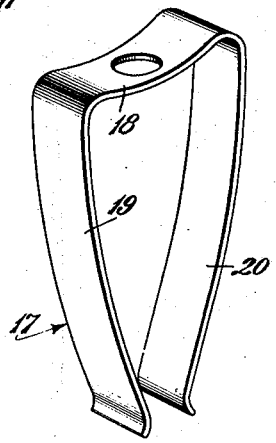
Figure 4:
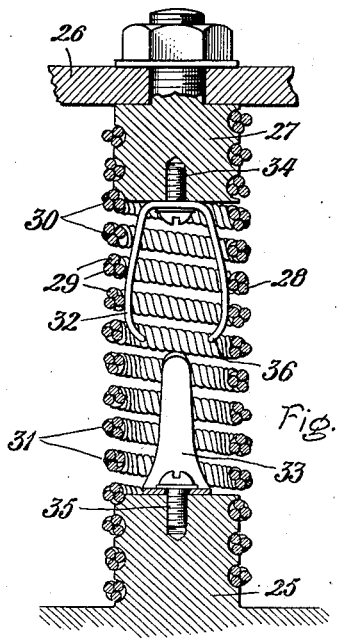
Figure 5:
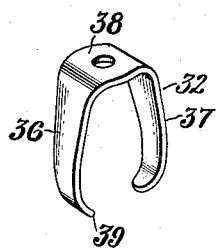

In the drawing, Fig. 1 is a yieldable supporting arrangement embodying my invention; Fig. 2 shows the arrangement of Fig. 1 with the elements in different relative positions; Fig. 3 is a perspective view of a dampening clip of the arrangement of Figs. 1 and 2; Fig. 4 is a modification of a yieldable supporting structure in accordance with my invention; and Fig. 5 is a perspective view of a vibration dampening clip used in the structure of Fig. 4.

The arrangement of Fig. 1 comprises a supporting element or support 10 and another machine element 11 held on the support 10 by means including an attachment member 12 and a helically wound spring 13. The attachment member 12 in the present instance is in the form of a bolt projecting through an opening in the machine element 11 and rigidly secured thereto by a washer 14 and a nut 15. The lower portion of the bolt 12 is enlarged and has a spiral groove 16 cut into its outer surface. A spiral groove is also cut into a portion of the support 10. The upper and lower turns of the helically wound spring 13 are held in said spiral grooves 16.

In order to reduce, minimize, or dampen vibratory motions of the spring I provide in accordance with my invention a spring clip 17. This clip, as clearly shown in Fig. 3, is somewhat U-shaped and has an upper portion or top 18 held between adjacent surfaces of the machine element 11 and the bolt or attachment member 12. The clip 17 is flexible and has legs 19 and 20 engaging portions of the intermediate turns of the helically wound spring 17. The legs when in operative position as shown in Figs. 1 and 2, exert a yieldable pressure onto diametrically opposite portions of several turns of the spring. It will be noted that the top 18 of the clip is curved so that when compressed between the machine member and the bolt the legs of said clip are forced inward and thereby pressed against the spring. The legs of the clip may be shaped so that, when the clip is clamped between the machine element and the bolt or attachment member, the legs lie flat against the coils of the spring, pressing with a force which is more or less uniform throughout the portion of the spring with which it is in contact. The individual portions of said turns in engagement with the spring have short circumferential lengths. Good results may be obtained with the legs 19 engaging two diametrically opposite points only of each turn.

The sidewise vibrations of the spring in one direction are also damped, since in order to vibrate in that direction the turns must slide along the flat surface of the spring clip. In such an arrangement the spring is not materially stiffened by the clip 17. During operation, the clip permits relative movement between the machine element and the support in any direction; that is, in the present instance, with respect to Fig. 1, the spring, together with the clip, permits the machine element to move up and down as well as sidewise.

Fig. 2 shows the arrangement of Fig. 1 with the machine element 11 turned sidewise with regard to the support 10. The clip just described is well adapted to minimize or reduce vibratory motions of the helically wound spring, in particular the high frequency harmonics of such motions.

In the arrangement of Fig. 4, I have shown a modification according to my invention in which means are provided for reducing or minimizing high frequency harmonics of vibratory motions, as well as low frequency harmonics of such motions. The high frequency harmonics of vibratory motions are dampened in accordance with my invention by the provision of a helically wound spring made of a plurality of twisted wires. The dampening of the low frequency harmonics is effected by fusing together the wires of at least a few turns adjacent the support and the machine element with some soft metal such as solder or lead.

The arrangement of Fig. 4 comprises a support 25 corresponding to the support 10 of Fig. 1 and a machine element 26 subject to vibration during operation and corresponding to the element 11 of Fig. 1. The machine element 26 is held on the support 25 by means including a bolt 27 corresponding to the bolt 12 of Fig. 1 and a spring 28 having upper end turns held in a helical groove on the bolt 27 and lower end turns held in a helical groove on the support 25. The spring 28 in accordance with the modification of my invention is made of a plurality of twisted wires 29, in the present instance the spring comprising three twisted wires.

In order to obtain the best results with the twisted spring, it is necessary to twist the wires of the spring in such a direction that when the load is applied to the spring the separate wires are twisted together more tightly. The direction of twist then depends on whether the spring is to be used under compression or tension. An additional feature of the twisted spring is that for a spring of the same stiffness as a solid spring the maximum fiber stress for a given deflection is considerably less for the twisted spring, so that the twisted spring may be deflected larger amounts than the solid spring without danger of overloading.

Two turns 30 adjacent the lower end of the bolt 27 and two turns 31 adjacent the upper end of the support 25 are soldered, that is, the individual wires of these turns are united by solder. The arrangement of Fig. 4 also includes another means for dampening the low frequency harmonics. These means comprise two clips 32 and 33 provided in the interior of the spring. The clip 32 is fastened to the lower end of the bolt 27 by means of a screw 34 and the clip 33 is fastened to the upper end of the support 25 by a screw 35. Each clip is U-shaped and has curved legs 36, 37 whose radius of curvature is the same as the inside radius of the helical spring. The top 38 of each clip is curved outward so that tightening of the clips to the machine element and the supporting element respectively causes the legs to spread and contact the spring. An end 39 of each leg is turned inward to permit sidewise turning movement of the element 26 without permitting the ends of the legs to enter the space defined intermediate adjacent turns. Intermediate curved portions of the legs of each clip engage at least one or more turns of the spring, more specifically short circumferential portions of such turns. The lower clip 33 is arranged in a vertical plane with respect to the plane of the upper clip 32 whereby the spring may be compressed without effecting interference between said clips.

With my invention I have accomplished an improved construction and arrangement for yieldable supporting structures including a helically wound spring whereby vibratory motions of such springs are substantially eliminated.

What I claim as new and desire to secure by Letters Patent in the United States is:

1. The combination of a supporting element, a machine element, means including a helically wound spring for securing the machine element to the supporting element, and means including a clip for reducing vibration of the spring, said clip being secured to one of said elements and having legs engaging short circumferential portions of several turns of the spring.

2. The combination of a supporting element, a machine element, means including a helically wound spring having end turns secured to said elements, and means for reducing vibration of the spring comprising a U-shaped clip having a portion secured to one of the elements and legs slidably engaging intermediate turns of the spring without materially stiffening the spring and without preventing the supported element from moving in any direction relative to the supporting element.

3. The combination of a support, a machine element, means for securing the machine element to the support including a helically wound spring having end turns secured to the machine element and the support respectively, said spring being made of a plurality of twisted wires to reduce the higher frequencies of vibration of the spring, and means including a clip secured to one of the elements and having legs engaging at least one turn of the spring to reduce the lower frequencies of vibration of the spring.

4. The combination of a supporting element, a machine element, means including a helically wound spring having end portions secured to said elements, to form a yieldable support for the machine element, the spring comprising a plurality of twisted wires, the individual wires of at least one turn adjacent one of said elements being united by fusing metal to reduce high frequency harmonics during vibration of the spring, and means for reducing low frequency harmonics of vibration.

5. The combination of a supporting element, a machine element, means including a helically wound spring having end portions secured to said elements to form a yieldable support for the machine element, the spring comprising a plurality of twisted wires, the individual wires of at least one turn adjacent each of said elements being united by fusing metal to reduce high frequency harmonics during vibration of the spring, and means for reducing low frequency harmonics of vibration, said means comprising two clips provided within the spring and secured to the supporting element and the machine element respectively, each clip having legs engaging at least a portion of the intermediate turns of the spring.

THEODORE M. BERRY.